United States Patent
Kapur et al.

(10) Patent No.: US 11,208,546 B2
(45) Date of Patent: Dec. 28, 2021

(54) ETHYLENE-BASED RESINS FOR CLOSURE APPLICATIONS

(71) Applicant: Dow Global Technologies LLC, Midland, MI (US)

(72) Inventors: Mridula Kapur, Lake Jackson, TX (US); Stephanie M. Whited, South Charleston, WV (US); Mark T. Jablonka, Pearland, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/328,312

(22) PCT Filed: Aug. 25, 2015

(86) PCT No.: PCT/US2015/046658
§ 371 (c)(1),
(2) Date: Jan. 23, 2017

(87) PCT Pub. No.: WO2016/033018
PCT Pub. Date: Mar. 3, 2016

(65) Prior Publication Data
US 2017/0210891 A1    Jul. 27, 2017

Related U.S. Application Data

(60) Provisional application No. 62/043,761, filed on Aug. 29, 2014.

(51) Int. Cl.
*C08L 23/08* (2006.01)
*C08L 23/04* (2006.01)
*B65D 53/00* (2006.01)
*C08L 23/06* (2006.01)

(52) U.S. Cl.
CPC .......... *C08L 23/0815* (2013.01); *B65D 53/00* (2013.01); *C08L 23/04* (2013.01); *C08L 23/06* (2013.01); *C08L 2203/162* (2013.01); *C08L 2205/02* (2013.01); *C08L 2205/025* (2013.01); *C08L 2207/062* (2013.01); *C08L 2314/02* (2013.01)

(58) Field of Classification Search
CPC ................................................ C08L 23/0815
See application file for complete search history.

(56) References Cited

U.S. PATENT DOCUMENTS

| | | | |
|---|---|---|---|
| 6,180,721 B1 * | 1/2001 | Rogestedt | H01B 3/441 525/191 |
| 7,396,878 B2 * | 7/2008 | Lustiger | C08L 23/06 525/191 |
| 7,919,449 B2 † | 4/2011 | Futterer | |
| 8,044,160 B2 | 10/2011 | Nord-Varhaug et al. | |
| 8,486,323 B2 * | 7/2013 | Davis | C08F 210/16 264/310 |
| 9,090,761 B2 | 7/2015 | Mannebach et al. | |
| 9,359,493 B2 | 6/2016 | Ribour et al. | |
| 9,574,064 B2 * | 2/2017 | Kapur | B29C 49/0005 |
| 2004/0034169 A1 * | 2/2004 | Zhou | C08F 10/00 525/240 |
| 2008/0221273 A1 * | 9/2008 | Michie, Jr. | C08L 23/06 525/240 |
| 2010/0056727 A1 * | 3/2010 | LiPiShan | C08L 23/04 525/240 |
| 2010/0084363 A1 * | 4/2010 | Michie, Jr. | C08L 23/08 215/200 |
| 2011/0034635 A1 * | 2/2011 | Kapur | C08F 10/00 525/240 |
| 2011/0136983 A1 * | 6/2011 | Kapur | B29C 49/0005 525/240 |
| 2013/0072632 A1 * | 3/2013 | Wang | C08L 23/08 525/53 |
| 2013/0075409 A1 * | 3/2013 | Kapur | C08L 23/04 220/562 |
| 2014/0171582 A1 * | 6/2014 | Wang | C08L 23/0815 524/528 |
| 2014/0371397 A1 * | 12/2014 | Ribour | C08L 23/06 525/240 |

FOREIGN PATENT DOCUMENTS

| | | |
|---|---|---|
| EP | 1753791 A1 | 2/2007 |
| WO | 2008/136849 | † 11/2008 |
| WO | WO2013045663 | * 4/2013 |
| WO | 2014/089670 | † 6/2014 |

OTHER PUBLICATIONS

Vinyl group, Wikipedia, date N/A.*
PCT/US2015/046658, International Search Report and Written Opinion dated Nov. 17, 2015.
PCT/US2015/046658, International Preliminary Report on Patentability dated Feb. 28, 2017.
Kissin, Y.V. and Mink, R. I. "Ethylene Polymerization Reactions with Multicenter Ziegler-Natta Catalysts—Manipulation of Active Center Distribution" Journal of Polymer Science: Part A: Polymer Chemistry, vol. 48, 4219-4229 (2010).
Singh, D. and Merrill, R. P. "Molecular Weight Distribution of Polyethylene Produced by Ziegler—Natta Catalysts" Macromolecules, vol. 4(5) 1971.
Kissin, et al. "AlR2Cl/MgR2 Combinations as Universal Cocatalysts for Ziegler-Natta, Metallocene, and Post-Metallocene Catalysts" Journal of Polymer Science: Part A: Polymer Chemistry, vol. 47, 3271-3285 (2009).

(Continued)

*Primary Examiner* — Irina Krylova (57) ABSTRACT

An ethylene-based resin comprising a high molecular weight component and a low molecular weight component, wherein the high molecular weight component comprises an ethylene/alpha-olefin copolymer or ethylene homopolymer, and has a density ranging from 0.940 g/cc to 0.960 g/cc, and a high load melt index (I21.6) ranging from 4 g/10 min to 15 g/10 min, and wherein the ethylene-based resin has: an overall density ranging from greater than 0.955 to less than or equal to 0.970 g/cc, an overall melt index (I2.16) ranging from 0.5 g/10 min to 7 g/10 min, and less than 0.2 vinyls per 1000 carbon atoms.

12 Claims, 3 Drawing Sheets

(56) References Cited

OTHER PUBLICATIONS

Melt Flow Index, Wikipedia, Hyperlink "https://en.wikipedia.org/wiki/Melt_flow_index" https://en.wikipedia.org/wiki/Melt_flow_index , retrieved Jan. 18, 2019.
Cazenave, J. et al. "Structural Approaches of Polyethylene Environmental Stress-Crack Resistance" Oil & Gas Science and Technology vol. 61 (2006), No. 6, pp. 735-742.
Lustiger A., "Environmental Stress Crazing" AT&T Bell Laboratories http://faculty.olin.edu/~~jstolk/failure2008/Homework/environmental%20stress%20cracking%202.pdf.
ASTM D3124-98, Standard Test Method for Vinylidene Unsaturation in Polyethylene by Infrared Spectrophotometry, published Mar. 2011.†
ASTM D1693-13, Standard Test Method for Environmental Stress-Cracking of Ethylene Plastics, published Apr. 2013.†

\* cited by examiner
† cited by third party

ETHYLENE-BASED RESINS FOR CLOSURE APPLICATIONS

FIELD

Embodiments of the present disclosure generally relate to ethylene-based resins for use in closure applications, and specifically, ethylene-based resins for use in hot-fill and aseptic closure applications.

BACKGROUND

In hot-fill and/or aseptic closure applications, the closure may be subjected to elevated temperatures (e.g., above 150° F.) and/or elevated pressures (e.g., above 15 psig) during or after the filling process. The hot-fill and/or aseptic closure market is currently dominated by two-piece closures, which may consist of a shell comprised of polypropylene (PP) and a liner comprised of styrene-ethylene/butylene-styrene (SEBS), thermoplastic vulcanates (TPVs) etc. This two part construction can be costly, and while it may be easier and more convenient to use a one piece closure, without a liner, such a design is difficult because the closure must be strong enough to withstand the closure needs and soft enough to provide an excellent seal while not contributing to the taste or aroma of the bottle contents. Specifically, the closure and/or the resin used to form the closure must have good stress crack resistance, sufficient stiffness (e.g., high enough secant modulus), good processability (e.g., moldability), and good (i.e., low) removal torque.

Accordingly, alternative ethylene-based resins that can be formed into a one-piece closure that may withstand high temperature and pressure conditions in hot-fill and/or aseptic applications are desired.

SUMMARY

Disclosed in embodiments herein are ethylene-based resins. The ethylene-based resins comprise a high molecular weight component and a low molecular weight component, wherein the high molecular weight component comprises an ethylene/alpha-olefin copolymer or ethylene homopolymer, and has a density ranging from 0.940 g/cc-0.960 g/cc, and a high load melt index ($I_{21.6}$) ranging from 4 g/10 min to 15 g/10 min, and wherein the ethylene-based resin has: an overall density ranging from greater than 0.955 to less than or equal to 0.970 g/cc, an overall melt index ($I_{2.16}$) ranging from 0.5 g/10 min to 7 g/10 min, and less than 0.2 vinyls per 1000 carbon atoms.

Also disclosed in embodiments herein are closures comprising ethylene-based resins. The ethylene-based resins comprise a high molecular weight component and a low molecular weight component, wherein the high molecular weight component comprises an ethylene/alpha-olefin copolymer or ethylene homopolymer, and has a density ranging from 0.940 g/cc-0.960 g/cc, and a high load melt index ($I_{21.6}$) ranging from 4 g/10 min to 15 g/10 min, and wherein the ethylene-based resin has: an overall density ranging from greater than 0.955 to less than or equal to 0.970 g/cc, an overall melt index ($I_{2.16}$) ranging from 0.5 g/10 min to 7 g/10 min, and less than 0.2 vinyls per 1000 carbon atoms.

Further disclosed in embodiments herein are methods of manufacturing ethylene-based resins. The methods comprise polymerizing a high molecular weight component comprising an ethylene/alpha-olefin copolymer or ethylene homopolymer in a reactor, wherein the high molecular weight component has a density ranging from 0.940 g/cc-0.960 g/cc, and a high load melt index ($I_{21.6}$) ranging from 4 g/10 min to 15 g/10 min, and polymerizing a low molecular weight component in a different reactor, thereby producing an ethylene-based resin, wherein the two reactors are operated in series, and wherein the ethylene-based resin has: an overall density ranging from greater than 0.955 to less than or equal to 0.970 g/cc, an overall melt index ($I_{2.16}$) ranging from 0.5 g/10 min to 7 g/10 min, and less than 0.2 vinyls per 1000 carbon atoms.

Additional features and advantages of the embodiments will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing and the following description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Reference will now be made in detail to embodiments of ethylene-based resins comprising a high molecular weight component and a low molecular weight component, methods of making the same, and closures made therefrom, examples of which are further described in the accompanying figures. As used herein, "ethylene-based" refers to resins that comprise a majority weight percent of ethylene (based on the weight of resin), and, optionally, one or more additional components. The high molecular weight component has a higher molecular weight than the low molecular weight component. The ethylene-based resins described herein may be used to produce closures for hot-fill or aseptic fill applications. It is noted, however, that this is merely an illustrative implementation of the embodiments disclosed herein. The embodiments are applicable to other technologies that are susceptible to similar problems as those discussed above. For example, the ethylene-based resins may also be used in large part injection molded durable item applications, which are clearly within the purview of the present embodiments.

High Molecular Weight Component

In embodiments herein, the high molecular weight component comprises an ethylene/alpha-olefin copolymer or ethylene homopolymer. In some embodiments, the high molecular weight component comprises an ethylene/alpha-olefin copolymer. In other embodiments, the high molecular weight component comprises ethylene homopolymer. As used herein, "ethylene/alpha-olefin copolymer" refers to a polymer comprising repeating units derived from ethylene and at least one alpha-olefin comonomer. "Ethylene homopolymer" refers to a polymer that consists essentially of repeating units derived from ethylene. In some examples, an ethylene homopolymer contains at least 99 percent by weight of ethylene units, at least 99.5% by weight of ethylene units, at least 99.8% by weight of ethylene units, or at least 99.9% by weight of ethylene units. The alpha-olefin comonomer may have no more than 20 carbon atoms. For example, the alpha-olefin comonomers may have 3 to 10 carbon atoms or 3 to 8 carbon atoms. Exemplary alpha-olefin comonomers may include, but are not limited to, propylene, 1-butene, 1-pentene, 1-hexene, 1-heptene, 1-octene, 1-nonene, 1-decene, and 4-methyl-1-pentene. In some embodiments, the alpha-olefin comonomers are selected from the group consisting of propylene, 1-butene, 1-hexene, and 1-octene. In other embodiments, the alpha-olefin comonomers are selected from the group consisting of 1-hexene and 1-octene.

In embodiments herein, the density of the high molecular weight component is from 0.940 g/cc-0.960 g/cc. All individual values and subranges of 0.940 to 0.960 g/cc are included and disclosed herein. For example, in some embodiments, the density of the high molecular weight component is from 0.945 to 0.960 g/cc. Densities disclosed herein for ethylene-based polymers are determined according to ASTM D-792.

In embodiments herein, the high load melt index ($I_{21.6}$) of the high molecular weight component is from 4 g/10 min to 15 g/10 min. All individual values and subranges of 4 g/10 min to 15 g/10 min are included and disclosed herein. For example, in some embodiments, the high load melt index ($I_{21.6}$) of the high molecular weight component is from 5 g/10 min to 13 g/10 min. In other embodiments, the high load melt index ($I_{21.6}$) of the high molecular weight component is from 6 g/10 min to 11 g/10 min. High load melt index, or $I_{21.6}$, for ethylene-based polymers is determined according to ASTM D1238 at 190° C., 21.6 kg.

In embodiments herein, the melt flow ratio ($I_{21.6}/I_{2.16}$) of the high molecular weight component may be from 25-40. All individual values and subranges of 25 to 40 are included and disclosed herein. For example, in some embodiments, the melt flow ratio ($I_{21.6}/I_{2.16}$) of the high molecular weight component is from 25-35. In other embodiments, the melt flow ratio ($I_{21.6}/I_{2.16}$) of the high molecular weight component is from 27-35. Melt index, or $I_{2.16}$, for ethylene-based polymers is determined according to ASTM D1238 at 190° C., 2.16 kg.

Low Molecular Weight Component

In embodiments herein, the low molecular weight component may be an ethylene homopolymer or an ethylene/alpha-olefin copolymer. In some embodiments, the low molecular weight component comprises an ethylene homopolymer. The comonomer may be an alpha-olefin as previously described herein. In some embodiments, the high molecular weight component is an ethylene-alpha-olefin copolymer and the low molecular weight component is an ethylene homopolymer. In other embodiments, the high molecular weight component is an ethylene homopolymer and the low molecular weight component is an ethylene homopolymer.

In embodiments herein, the density of the low molecular weight component may range from 0.960 to 0.985 g/cc. All individual values and subranges of 0.960 to 0.985 g/cc are included and disclosed herein. For example, in some embodiments, the density of the low molecular weight component may range from 0.965 to 0.985 g/cc. In other embodiments, the density of the low molecular weight component may range from 0.970 to 0.985 g/cc. In further embodiments, the density of the low molecular weight component may range from 0.970 to 0.980 g/cc. The density of the low molecular weight component may be calculated from the following equation (I):

$$\frac{1}{\text{Density }(EBR)} = \frac{\text{Weight Fraction }(A)}{\text{Density }(A)} + \frac{\text{Weight Fraction }(B)}{\text{Density }(B)} \quad (I)$$

wherein "A" is the high molecular weight component, "B" is the low molecular weight component, and "EBR" is the ethylene-based resin. In some embodiments, the low molecular weight component has a density that is at least 0.005 g/cc higher than the high molecular weight component.

Ethylene-Based Resin

In embodiments herein, the ethylene-based resin has an overall density ranging from greater than 0.955 to less than or equal to 0.970 g/cc. All individual values and subranges of greater than 0.955 to less than or equal to 0.970 g/cc are included and disclosed herein. For example, in some embodiments, the ethylene-based resin has an overall density ranging from 0.957 to 0.970 g/cc, 0.960 to 0.970 g/cc, or 0.962 to 0.970 g/cc.

In embodiments herein, the ethylene-based resin has an overall melt index ($I_{2.16}$) ranging from 0.5 g/10 min to 7 g/10 min. All individual values and subranges of 0.5 g/10 min to 7 g/10 min are included and disclosed herein. For example, in some embodiments, the ethylene-based resin has an overall melt index ($I_{2.16}$) ranging from 1 g/10 min to 7 g/10 min, 1.5 g/10 min to 7 g/10 min, 2 g/10 min to 7 g/10 min, 2.5 g/10 min to 7 g/10 min, 2 g/10 min to 6 g/10 min, or 2.5 g/10 min to 5.5 g/10 min.

In embodiments herein, the ethylene-based resin may have a high load melt index ($I_{21.6}$) of 25 g/10 min to 350 g/10 min. All individual values and subranges of 25 g/10 min to 350 g/10 min are included and disclosed herein. For example, in some embodiments, the ethylene-based resin may have a high load melt index ($I_{21.6}$) from 35 to 350 g/10 min, from 50 to 300 g/10 min, from 75 to 300 g/10 min, from 100 to 275 g.10 min, or from 125 to 275 g/10 min.

In embodiments herein, the ethylene-based resin may have a melt flow ratio ($I_{21.6}/I_{2.16}$) of greater than 40. All individual values and subranges of greater than 40 are included and disclosed herein. For example, in some embodiments, the ethylene-based resin may have a melt flow ratio ($I_{21.6}/I_{2.16}$) of 40 to 100. In other embodiments, the ethylene-based resin may have a melt flow ratio ($I_{21.6}/I_{2.16}$) of 40 to 90, 40 to 85, 40 to 75, or 40 to 65.

In embodiments herein, the ethylene-based resin may have a weight average molecular weight (Mw) of 75,000 g/mole to 115,000 g/mole. All individual values and subranges of 75,000 g/mole to 115,000 g/mole are included and disclosed herein. For example, in some embodiments, the ethylene-based resin may have a weight average molecular weight of 75,000 g/mole to 110,000 g/mole, 75,000 g/mole to 100,000 g/mole, or 75,000 g/mole to 95,000 g/mole.

The weight average molecular weight may be determined by gel permeation chromatography (GPC).

In embodiments herein, the ethylene-based resin may have a molecular weight distribution (MWD) of from 6 to 12. All individual values and subranges of 6 to 12 are included and disclosed herein. As used herein, MWD refers to the ratio of weight average molecular weight (Mw) to number average molecular weight (Mn), that is, (Mw/Mn). In some embodiments, the ethylene-based resin may have a molecular weight distribution (MWD) of from 6.5 to 11. The number average molecular weight (Mn) may be determined by gel permeation chromatography (GPC).

The ethylene-based resin may comprise any amount of the high molecular weight component or the low molecular weight component. In some embodiments, either component can be present, independently, in amounts of 0.5% to 99.5%, by weight of the ethylene-based resin. All individual values and subranges of 0.5% to 99.5% are included and disclosed herein. For example, in some embodiments, the ethylene-based resin comprises 30% to 60%, by weight, 35% to 65%, by weight, 40% to 60%, by weight, 35% to 55%, by weight, or 40% to 55%, by weight, of the high molecular weight component. In other embodiments, the ethylene-based resin comprises 30% to 60%, by weight, 35% to 65%, by weight, 35% to 55%, by weight, 40% to 60%, by weight, or 45% to 60%, by weight of the low molecular weight component.

In embodiments herein, the ethylene-based resin contains low levels of vinyl groups present in the backbone of the ethylene-based resin. In some embodiments, the ethylene-based resin may have less than 0.2 vinyls per 1000 carbon atoms. All individual values and subranges from less than 0.2 vinyls per 1000 carbon atoms are included and disclosed herein. In other embodiments, the ethylene-based resin may have less than 0.18 vinyls per 1000 carbon atoms. In further embodiments, the ethylene-based resin may have less than 0.16 vinyls per 1000 carbon atoms. In even further embodiments, the ethylene-based resin may have 0.01 to 0.2, 0.01 to 0.18, 0.05 to 0.2, 0.01 to 0.16, or 0.05 to 0.16 vinyls per 1000 carbon atoms. Without being bound by theory, it is believed that low levels of vinyl groups present in the backbone of the ethylene-based resin may reduce resin degradation during article fabrication, and therefore, reduce formation of species, for example, oxidative species, which can contribute to poor organoleptic properties.

In embodiments herein, the ethylene-based resin may exhibit an environmental stress crack resistance (ESCR) (F50) according to ASTM D-1693, condition B at 50° C. using 100% nonylphenol ethoxylate with 9 moles of ethylene oxide, in the range of 10 to 60 hours. All individual values and subranges of 10 to 60 hours are included and disclosed herein. For example, in some embodiments, the ethylene-based resin may exhibit an environmental stress crack resistance (ESCR) (F50) according to ASTM D-1693, condition B at 50° C. using 100% nonylphenol ethoxylate with 9 moles of ethylene oxide, in the range of 10 to 50 hours. In other embodiments, the ethylene-based resin may exhibit an environmental stress crack resistance (ESCR) (F50) according to ASTM D-1693, condition B at 50° C. using 100% nonylphenol ethoxylate with 9 moles of ethylene oxide, in the range of 10 to 45 hours.

In embodiments herein, the ethylene-based resin may exhibit a flexural, 2% secant modulus greater than 200,000 psi. All individual values and subranges of greater than 200,000 psi are included and disclosed herein. For example, in some embodiments, the ethylene-based resin may exhibit a flexural, 2% secant modulus of greater than 200,000 to 250,000 psi. The flexural, 2% secant modulus may be measured according to ASTM D790.

The ethylene-based resins described herein may contain one or more additives. Suitable additives may include, but are not limited to, processing aids, acid neutralizers, UV stabilizers, hydro peroxide decomposers, alkyl radical scavengers, hindered amine stabilizers, multifunctional stabilizers, phosphites, antioxidants, process stabilizers, metal deactivators, additives to improve oxidative or chlorine resistance, pigments or colorants, nucleating agents, fatty acid stearates, fluoroelastomers, fillers, and combinations thereof.

In embodiments herein, the ethylene-based resin can be made by a variety of methods. For example, such methods may include, but are not limited to, gas phase polymerization process, slurry phase polymerization process, liquid phase polymerization process, and combinations thereof using one or more conventional reactors, e.g. fluidized bed gas phase reactors, loop reactors, stirred tank reactors, batch reactors in parallel, series, and/or any combinations thereof. In the alternative, the ethylene-based resin may be produced in a high pressure reactor via a coordination catalyst system. For example, the ethylene-based resin may be produced via gas phase polymerization process in a gas phase reactor; however, the instant invention is not so limited, and any of the above polymerization processes may be employed. In some embodiments, the polymerization reactor may comprise of two or more reactors in series, parallel, or combinations thereof, and wherein each polymerization takes place in solution, in slurry, or in the gas phase. In some embodiments, a dual reactor configuration is used where the polymer made in the first reactor can be either the high molecular weight component or the low molecular weight component. The polymer made in the second reactor may have a density and melt flow rate such that the overall density and melt flow rate of the polyethylene resin are met. Similar polymerization processes are described in, for example, WO 2004/101674A, which is incorporated herein by reference.

In embodiments herein, a method of manufacturing an ethylene-based resin may comprise polymerizing a high molecular weight component, as previously described herein, in a reactor, and polymerizing a low molecular weight component, as previously described herein, in a different reactor, thereby producing an ethylene-based resin. The two reactors may be operated in series. In some embodiments, the high molecular weight component is polymerized in a first reactor, and the low molecular weight component is polymerized in a second reactor. In other embodiments, the low molecular weight component is polymerized in a first reactor, and the high molecular weight component is polymerized in a second reactor.

The weight ratio of copolymer prepared in the high molecular weight reactor to copolymer prepared in the low molecular weight reactor can be in the range of about 30:70 to about 70:30, in the range of about 40:60 to about 60:40, in the range of about 40:60 to about 55:45. This is also known as the polymer split.

In some embodiments, the ethylene-based resin is manufactured using at least one Ziegler-Natta (Z-N) catalyst system. In other embodiments, the ethylene-based resin is manufactured using multiple reactors in series with a Z-N catalyst being fed to either each reactor or to just the first reactor. In further embodiments, the Z-N catalyst system may be fed into one or two independently-controlled reactors configured sequentially, and operated in solution, slurry or gas phase. In even further embodiments, the Z-N catalyst system may be fed into one or two independently-controlled reactors configured sequentially, and operated in gas phase. Sequential polymerization may be conducted such that fresh catalyst is injected into one reactor, and active catalyst is carried over from the first reactor into the second reactor. The resulting ethylene-based resin may be characterized as comprising component polymers, each having distinct, unimodal molecular weight distributions. As used herein, "distinct," when used in reference to the molecular weight distribution of the high molecular weight component and the low molecular weight component means there are two corresponding molecular weight distributions in the resulting GPC curve of the ethylene-based resin. As used herein, "unimodal," when used in reference to the molecular weight distribution of a component polymer of the ethylene-based resin means the molecular weight distribution in a GPC curve of the component polymer does not substantially exhibit multiple molecular weight distributions.

The term "procatalyst" or "precursor", are used interchangeably herein, and denote a compound comprising a ligand, a transition metal, and optionally, an electron donor. The procatalyst may further undergo halogenation by contacting with one or more halogenating agents. A procatalyst can be converted into a catalyst upon activation. Such catalysts are commonly referred to as Ziegler-Natta catalysts. Suitable Zeigler-Natta catalysts are known in the art and include, for example, the catalysts taught in U.S. Pat. Nos. 4,302,565; 4,482,687; 4,508,842; 4,990,479; 5,122,494; 5,290,745; and, 6,187,866 B1, the disclosures of which are hereby incorporated by reference. The collection of catalyst components, such as procatalyst(s), cocatalyst(s), is referred to as a catalyst system.

The transition metal compound of the procatalyst composition can comprise compounds of different kinds. The most usual are titanium compounds—organic or inorganic—having an oxidation degree of 3 or 4. Other transition metals such as, vanadium, zirconium, hafnium, chromium, molybdenum, cobalt, nickel, tungsten and many rare earth metals are also suitable for use in Ziegler-Natta catalysts. The transition metal compound is usually a halide or oxyhalide, an organic metal halide or purely a metal organic compound. In the last-mentioned compounds, there are only organic ligands attached to the transition metal.

The procatalyst can have the formula $Mg_d Me(OR)_e X_f (ED)_g$ wherein R is an aliphatic or aromatic hydrocarbon radical having 1 to 14 carbon atoms or COW wherein R' is a aliphatic or aromatic hydrocarbon radical having 1 to 14 carbon atoms; each OR group is the same or different; X is independently chlorine, bromine or iodine; ED is an electron donor; d is 0.5 to 56; e is 0, 1, or 2; f is 2 to 116; and g is >1 to 1.5(d). Me is a transition metal selected from the group of titanium, zirconium, hafnium and vanadium. Some specific examples of suitable titanium compounds are: $TiCl_3$, $TiCl_4$, $Ti(OC_2H_5)_2Br_2$, $Ti(OC_6H_5)Cl_3$, $Ti(OCOCH_3)Cl_3$, $Ti(acetylacetonate)_2Cl_2$, $TiCl_3(acetylacetonate)$, and $TiBr_4$. $TiCl_3$ and $TiCl_4$ are preferred titanium compounds.

The magnesium compounds include magnesium halides such as $MgCl_2$, $MgBr_2$, and $MgI_2$. Anhydrous $MgCl_2$ is a preferred compound. Other compounds useful in the invention are $Mg(OR)_2$, $Mg(OCO_2Et)$ and MgRCl where R is defined above. About 0.5 to about 56, and preferably about 1 to about 20, moles of the magnesium compounds are used per mole of transition metal compound. Mixtures of these compounds may also be used.

The procatalyst compound can be recovered as a solid using techniques known in the art, such as precipitation of the procatalyst or by spray drying, with or without fillers. Spray drying is a particularly preferred method for recovery of the procatalyst compound. Spray drying is taught in U.S. Pat. No. 5,290,745 and is hereby incorporated by reference. A further procatalyst comprising magnesium halide or alkoxide, a transition metal halide, alkoxide or mixed ligand transition metal compound, an electron donor and optionally, a filler can be prepared by spray drying a solution of said compounds from an electron donor solvent.

The electron donor is typically an organic Lewis base, liquid at temperatures in the range of about 0° C. to about 200° C., in which the magnesium and transition metal compounds are soluble. The electron donor can be an alkyl ester of an aliphatic or aromatic carboxylic acid, an aliphatic ketone, an aliphatic amine, an aliphatic alcohol, an alkyl or cycloalkyl ether, or mixtures thereof, each electron donor having 2 to 20 carbon atoms. Among these electron donors, the preferred are alkyl and cycloalkyl mono-ethers having 2 to 20 carbon atoms; dialkyl, diaryl, and alkylaryl ketones having 3 to 20 carbon atoms; and alkyl, alkoxy, and alkylalkoxy esters of alkyl and aryl carboxylic acids having 2 to 20 carbon atoms. Mono-ether is defined herein as a compound that contains only one ether functional group in the molecule. For ethylene homo and co-polymerization, the most preferred electron donor is tetrahydrofuran. Other examples of suitable electron donors are methyl formate, ethyl acetate, butyl acetate, ethyl ether, dioxane, di-n-propyl ether, dibutyl ether, ethanol, 1-butanol, ethyl formate, methyl acetate, ethyl anisate, ethylene carbonate, tetrahydropyran, and ethyl propionate.

While an excess of electron donor may be used initially to provide the reaction product of transition metal compound and electron donor, the reaction product finally contains about 1 to about 20 moles of electron donor per mole of transition metal compound and preferably about 1 to about 10 moles of electron donor per mole of transition metal compound. The ligands comprise halogen, alkoxide, aryloxide, acetylacetonate and amide anions.

Partial activation of the procatalyst can be carried out prior to the introduction of the procatalyst into the reactor. The partially activated catalyst alone can function as a polymerization catalyst but at greatly reduced and commercially unsuitable catalyst productivity. Complete activation by additional cocatalyst is required to achieve full activity. The complete activation occurs in the polymerization reactor via addition of cocatalyst.

The catalyst procatalyst can be used as dry powder or slurry in an inert liquid. The inert liquid is typically a mineral oil. The slurry prepared from the catalyst and the inert liquid has a viscosity measured at 1 $sec^{-1}$ of at least 500 cp at 20° C. Examples of suitable mineral oils are the Kaydol and Hydrobrite mineral oils from Crompton.

In one embodiment in a polymerization process, the procatalyst undergo in-line reduction using reducing agent(s). The procatalyst is introduced into a slurry feed tank; the slurry then passes via a pump to a first reaction zone immediately downstream of a reagent injection port where the slurry is mixed with the first reagent, as described below. Optionally, the mixture then passes to a second reaction zone immediately downstream of a second reagent injection port where it is mixed with the second reagent (as described below) in a second reaction zone. While only two reagent injection and reaction zones are described above, additional reagent injection zones and reaction zones may be included, depending on the number of steps required to fully activate and modify the catalyst to allow control of the specified fractions of the polymer molecular weight distribution. Means to control the temperature of the catalyst procatalyst feed tank and the individual mixing and reaction zones are provided.

Depending on the activator compound used, some reaction time may be required for the reaction of the activator compound with the catalyst procatalyst. This is conveniently done using a residence time zone, which can consist either of an additional length of slurry feed pipe or an essentially plug flow holding vessel. A residence time zone can be used for both activator compounds, for only one or for neither, depending entirely on the rate of reaction between activator compound and catalyst procatalyst.

Exemplary in-line reducing agents are aluminum alkyls and aluminum alkyl chlorides of the formula $AlR_xCl_y$, where X+Y=3 and y is 0 to 2 and R is a C1 to C14 alkyl or aryl radical. Such in-line reducing agents include those listed in the following table:

| Reducing Agents | Reducing Agents |
| --- | --- |
| Diethylaluminum chloride | Triethylaluminum |
| Ethylaluminum dichloride | Trimethylaluminum |
| di-isobutyaluminum chloride | Triisobutylaluminum |
| dimethylaluminum chloride | Tri-n-hexylaluminum |
| Methylaluminum sesquichloride | Tri-n-octylaluminum |
| Ethylaluminum sesquichloride | Dimethylaluminum chloride |

The entire mixture is then introduced into the reactor where the activation is completed by the cocatalyst. Additional reactors may be sequenced with the first reactor, however, catalyst is typically only injected into the first of these linked, sequenced reactors with active catalyst transferred from a first reactor into subsequent reactors as part of the polymer thus produced.

The cocatalysts, which are reducing agents, conventionally used are comprised of aluminum compounds, but compounds of lithium, sodium and potassium, alkaline earth metals as well as compounds of other earth metals than aluminum are possible. The compounds are usually hydrides, organometal or halide compounds. Conventionally, the cocatalysts are selected from the group comprising Al-trialkyls, Al-alkyl halides, Al-alkyl alkoxides and Al-alkyl alkoxy halides. In particular, Al-alkyls and Al-alkyl chlorides are used. These compounds are exemplified by trimethylaluminum, triethylaluminum, tri-isobutylaluminum, tri-n-hexylaluminum, dimethylaluminum chloride, diethylaluminum chloride, ethylaluminum dichloride and diisobutylaluminum chloride, isobutylaluminum dichloride and the like. Butyllithium and dibutylmagnesium are examples of useful compounds of other metals.

The ethylene-based resins described herein can be used to manufacture a shaped/molded article, or one or more components of a shaped/molded article. Such articles may be single-layer or multi-layer articles, which may be obtained by suitable known conversion techniques, applying heat, pressure, or a combination thereof, to obtain the desired article. Examples of suitable conversion techniques may include, for example, blow-molding, co-extrusion blow-molding, injection molding, injection stretch blow molding, compression molding, extrusion, pultrusion, calendering and thermoforming. Shaped/molded articles may include, for example, closures, bottles, blow molded articles, injection molded articles, compression molded articles, drip tapes and tubings, geomembranes, films, sheets, fibers, profiles and moldings.

In embodiments herein, the ethylene-based resins described herein may be particularly well-suited for use in manufacturing a shaped article or one or more components of a shaped article. In some embodiments, the ethylene-based resins described herein may be particularly well-suited for use in manufacturing closures. In other embodiments, the ethylene-based resins described herein may be particularly well-suited for use in manufacturing single-piece closures. In further embodiments, the ethylene-based resins described herein may be particularly well-suited for use in manufacturing single-piece closures suitable for hot-fill and/or aseptic applications.

Test Methods

Unless otherwise stated, the following test methods are used. All test methods are current as of the filing date of this disclosure.

Density

Samples that are measured for density are prepared according to ASTM D4703. Measurements are made within one hour of sample pressing using ASTM D792, Method B.

Melt Index

Melt index, or $I_{2.16}$, for ethylene-based polymers is determined according to ASTM D1238 at 190° C., 2.16 kg. Melt Index, or $I_5$, for ethylene-based polymers is determined according to ASTM D1238 at 190° C., 5.0 kg. High load melt index or Flow Index, or $I_{21.6}$, for ethylene-based polymers is determined according to ASTM D1238 at 190° C., 21.6 kg.

Gel Permeation Chromatography (GPC) Molecular Weight Determination

Polymer molecular weight is characterized by high temperature gel permeation chromatography (GPC). The chromatographic system consists of a Polymer Laboratories "GPC-220 high temperature" chromatograph, equipped with a Precision Detectors (Amherst, Mass.) 2-angle laser light scattering detector, Model 2040, and a 4-capillary differential viscometer detector, Model 210R, from Viscotek (Houston, Tex.). The 15° angle of the light scattering detector is used for calculation purposes.

Data collection is performed using PolymerChar (Valencia, Spain) GPC One Instrument Control. The system is equipped with an on-line solvent degas device from Polymer Laboratories. The carousel compartment and column compartment are operated at 150° C. The columns are four Polymer Laboratories "Mixed A" 20 micron columns, and one 20 um guard column. The polymer solutions are prepared in 1,2,4 trichlorobenzene (TCB). The samples are prepared at a concentration of 0.1 grams of polymer in 50 ml of solvent. The chromatographic solvent and the sample preparation solvent contain 200 ppm of butylated hydroxytoluene (BHT). Both solvent sources are nitrogen sparged. Polyethylene samples are stirred gently at 160° C. for 4 hours. The injection volume is 200 μl, and the flow rate is 1.0 ml/minute.

Calibration of the GPC column set is performed with 21 narrow molecular weight distribution polystyrene standards. The molecular weights of the standards range from 580 to 8,400,000, and are arranged in 6 "cocktail" mixtures, with at least a decade of separation between individual molecular weights. The polystyrene standard peak molecular weights are converted to polyethylene molecular weights using the following equation (as described in Williams and Ward, J. Polym. Sci., Polym. Let., 6, 621 (1968)):

$$M_{polyethylene}=A\times(M_{polystyrene})^B,$$

where M is the molecular weight, A has a value of 0.4316, and B is equal to 1.0.

A fifth order polynomial is used to fit the respective polyethylene-equivalent calibration points. The total plate count of the GPC column set is performed with Eicosane (prepared at 0.04 g in 50 milliliters of TCB, and dissolved for 20 minutes with gentle agitation.) The plate count and symmetry are measured on a 200 microliter injection according to the following equations:

$$PlateCount = 5.54 * \left(\frac{RV \text{ at Peak Maximum}}{\text{Peak Width at } \frac{1}{2} \text{ height}}\right)^2$$

where RV is the retention volume in milliliters, and the peak width is in milliliters.

$$Symmetry = \frac{\left(\text{Rear Peak Width at } \frac{1}{10} \text{ height}\right) - (RV \text{ at Peak Maximum})}{(RV \text{ at Peak Maximum}) - \left(\text{Front Peak Width at } \frac{1}{10} \text{ height}\right)},$$

where RV is the retention volume in milliliters, and the peak width is in milliliters.

The calculations of Mn, Mw, and Mz are based on GPC results using the RI detector are determined from the following equations:

$$\overline{Mn} = \frac{\sum^i RI_i}{\sum^i (RI_i / Mcalibration_i)},$$

$$\overline{Mw} = \frac{\sum^i (RI_i * Mcal_i)}{\sum^i (RI_i)},$$

$$\overline{Mz} = \frac{\sum^i (RI_i * Mcal_i)^2}{\sum^i (RI_i * Mcal_i)}$$

In order to monitor the deviations over time, which may contain an elution component (caused by chromatographic changes) and a flow rate component (caused by pump changes), a late eluting narrow peak is generally used as a "marker peak". A flow rate marker is therefore established based on decane flow marker dissolved in the eluting sample. This flow rate marker is used to linearly correct the flow rate for all samples by alignment of the decane peaks. Any changes in the time of the marker peak are then assumed to be related to a linear shift in both flow rate and chromatographic slope. The preferred column set is of 20 micron particle size and "mixed" porosity to adequately separate the highest molecular weight fractions appropriate to the claims. The plate count for the chromatographic system (based on eicosane as discussed previously) should be greater than 20,000, and symmetry should be between 1.00 and 1.12.

Deflection Temperature Under Load

The deflection temperature under load (also known as the heat distortion temperature under load) is determined according to ASTM D648, at 66 psi, unannealed.

Vicat Softening Temperature

The vicat softening temperature is determined according to ASTM D1525, at 120° C./h, 10N load.

Differential Scanning calorimetry (DSC)

DSC results are generated using a TA Instruments Model Q1000 DSC, equipped with an RCS (refrigerated cooling system) cooling accessory and an auto sampler. A nitrogen purge gas flow of 50 ml/min is used throughout. The sample is pressed into a thin film, using a press at 175° C. and 1500 psi (10.3 MPa) maximum pressure for about 15 seconds, then air-cooled to room temperature at atmospheric pressure. About 3 to 10 mg of material is then cut into a 6 mm diameter disk using a paper hole punch, and weighed to the nearest 0.001 mg. The disk is placed in a light aluminum pan (about 50 mg weight) and then crimped shut. The sample is thermally treated using the following temperature profile: (1) the sample is rapidly heated to 180° C., and held isothermal for 3 minutes in order to remove any previous thermal history, (2) the sample is then cooled to −40° C. at a 10° C./min cooling rate, and is held at −40° C. for 3 minutes, (3) the sample is then heated to 150° C. at 10° C./min heating rate. The cooling curve and second heating curve are recorded and used to determine $T_{cryst}$, $\Delta H_{cryst}$, $T_{melt}$, and $\Delta H_{melt}$.

Flexural, 2% Secant Modulus

The flexural, secant modulus at 2% strain is determined according to ASTM D790,

Closure Removal Torque (RT)

Removal Torque is measured using a Mecmesin Orbis Closure Torque Tester at 21° C.

Closure Environmental Stress Crack Resistance (ESCR)

A temperature controlled chamber is set to 40° C. The 28 mm PCO 1881 closures were applied to injection molded 1881 PET bottle finishes at 18 in-lbs of torque using an automated Steinfurth TMS 5000 closure application instrument. The bottle finish part of the assembly is outfitted with tubing in the base that is then attached to an air supply at the top of the controlled chamber and held upside down. The closure is fully immersed in a 10% nonylphenol ethoxylate with 9 moles of ethylene oxide solution. The pressure inside the preform/closure assembly is then set at 6 bars and monitored until a crack develops on the closure. The time it takes for a crack to develop is recorded, as well as the relative position of the crack on the closure, either top panel or corner typically.

Resin Environmental Stress Crack Resistance (ESCR)

The resin environmental stress crack resistance (ESCR) (F50) is measured according to ASTM-D 1693-01, Condition B, at 50° C. using 100% nonylphenol ethoxylate with 9 moles of ethylene oxide. The ESCR value is reported as F50, the calculated 50 percent failure time from the probability graph.

IR Polymer Characterization

The vinyl groups per 1,000 carbons are measured according to ASTM D6248-98 (reapproved 2004).

Shear Viscosity

Capillary viscosity was measured at 190° C. on a Rosand RH 2000 fitted with a flat entrance (180 degrees) die of length 16 mm and diameter of 1 mm at apparent shear rates ranging from 160 to 6300 s-1. Rabinowitsch correction is applied to account for the shear thinning effect.

Tensile Properties

Tensile properties were measured per ASTM D638 and ASTM D4976.

EXAMPLES

The embodiments described herein may be further illustrated by the following non-limiting examples.

Inventive Example Resins

Inventive resins 1-4 were prepared as follows: each resin is an ethylene-based resin produced using a catalyst system comprising a procatalyst, UCAT™ J (commercially available from Univation Technologies, LLC, Houston, Tex.), and a cocatalyst, triethylaluminum (TEAL), in a gas phase polymerization process. The UCAT™ J catalyst was partially activated by contact at room temperature with an appropriate amount of a 50 percent mineral oil solution of tri-n-hexyl aluminum (TNHA). The catalyst slurry was added to a mixing vessel. While stirring, a 50 percent mineral oil solution of tri-n-hexyl aluminum (TNHA) was added at ratio of 0.17 moles of TNHA to mole of residual THF in the catalyst and stirred for at least 1 hour prior to use. Ethylene (C2) and optionally, 1-hexene (C6) were polymerized in two fluidized bed reactors. Each polymerization was continuously conducted, after equilibrium was reached, under the respective conditions, as shown below in Tables 1A & 1B. Polymerization was initiated in the first reactor by continuously feeding the catalyst and cocatalyst (trialkyl aluminum, specifically tri ethyl aluminum or TEAL) into a fluidized bed of polyethylene granules, together with ethylene, hydrogen, and, optionally, 1-hexene. The resulting polymer, mixed with active catalyst, was withdrawn from the first reactor, and transferred to the second reactor, using second reactor gas as a transfer medium. The second reactor also contained a fluidized bed of polyethylene granules. Ethylene and hydrogen were introduced into the second reactor, where the gases came into contact with the polymer and catalyst from the first reactor. Inert gases, nitrogen and isopentane, made up the remaining pressure, in both the first and second reactors. In the second reactor, the cocatalyst (TEAL) was again introduced. The final product blend was continuously removed. Table 1A lists polymerization conditions for inventive resins 1 & 2, and Table 1B lists the polymerization conditions for inventive resins 3 & 4.

Comparative Example Resins

Comparative Example A is a high density polyethylene resin commercially available as DMDA-8007 NT 7 from The Dow Chemical Company (Midland, Mich.). The Comparative Example A resin sample had a measured density of 0.966 g/cm$^3$ and a measured melt index, $I_{2.16}$, of 7.8 g/10 min. Comparative Example B is a high density polyethylene resin commercially available as DMDC-1210 NT 7 from The Dow Chemical Company (Midland, Mich.). The Comparative Example B resin sample had a measured density of 0.952 g/cm$^3$ and a measured melt index, $I_{2.16}$, of 9.0 g/10 min.

Closure Fabrication

The inventive and comparative resins were used to form 28 mm PCO 1881 finish 2.3 g one piece carbonated soft drink (CSD) closures. The closures were molded using a 50 ton injection molding press. A 0.48 second injection time, 0.8 second hold time and 2.0 second cooling time were used during fabrication. The injection rate was 18.64 cm3/s. The mold temperature ranged from 13 to 14° C. The temperature profile on the extruders ranged from 190 to 230° C., delivering a resin melt temperature between 200 and 230° C.

TABLE 1A

Process Conditions for Inventive Resins 1 & 2

| | Inventive Resin 1 | | Inventive Resin 2 | |
|---|---|---|---|---|
| Reactor | #1 | #2 | #1 | #2 |
| Catalyst | UCAT ™ J | | UCAT ™ J | |
| Temperature, ° C. | 85.0 | 103.0 | 85.0 | 103.0 |
| Pressure, psig | 349 | 389 | 348 | 393 |
| C2 Partial Pressure, psi | 38.0 | 102.1 | 38.0 | 111.8 |
| H2/C2 Molar Ratio | 0.195 | 1.40 | 0.178 | 1.40 |
| C6/C2 Molar Ratio | 0.000 | 0.000 | 0.008 | 0.000 |
| IC5% | 12.2 | 3.0 | 12.1 | 4.9 |
| Cat Feed Rate, cc/hr | 11.3 | | 7 | |
| Cocatalyst | 2.5% TEAL | 2.5% TEAL | 2.5% TEAL | 2.5% TEAL |
| Cocat. Feed Rate, cc/hr | 381 | 111 | 264 | 136 |
| Production Rate, lb/hr | 29.5 | 32.6 | 30.4 | 33.0 |
| Bed Weight, lbs | 80.7 | 177.3 | 81.4 | 180.5 |
| Split % | 47.5 | 52.5 | 48.0 | 52.0 |
| RESIN PROPERTIES | | | | |
| Melt Index, g/10 min $I_{2.16}$ | 0.19 | | 0.20 | |

TABLE 1A-continued

Process Conditions for Inventive Resins 1 & 2

| | Inventive Resin 1 | | Inventive Resin 2 | |
|---|---|---|---|---|
| Reactor | #1 | #2 | #1 | #2 |
| Melt Index, g/10 min $I_5$ | 0.61 | | 0.62 | |
| Melt Index, g/10 min $I_{21.6}$ | 6.12 | | 5.98 | |
| Density, g/cc | 0.9557 | | 0.9469 | |
| MFR ($I_{21.6}/I_{2.16}$) | 32.9 | | 30.4 | |
| MFR ($I_{21.6}/I_5$) | 10.1 | | 9.6 | |

TABLE 1B

Process Conditions for Inventive Resins 3 & 4

| | Inventive Resin 3 | | Inventive Resin 4 | |
|---|---|---|---|---|
| Reactor | #1 | #2 | #1 | #2 |
| Catalyst | UCAT ™ J | | UCAT ™ J | |
| Temperature, ° C. | 85.0 | 103.0 | 85.0 | 103.0 |
| Pressure, psig | 348 | 393 | 349 | 393 |
| C2 Partial Pressure, psi | 38.0 | 102.7 | 38.0 | 105.1 |
| H2/C2 Molar Ratio | 0.242 | 1.20 | 0.228 | 1.20 |
| C6/C2 Molar Ratio | 0.000 | 0.000 | 0.010 | 0.000 |
| IC5% | 12.1 | 5.5 | 12.2 | 5.6 |
| Cat Feed Rate, cc/hr | 11 | | 7 | |
| Cocatalyst | 2.5% TEAL | 2.5% TEAL | 2.5% TEAL | 2.5% TEAL |
| Cocat. Feed Rate, cc/hr | 418 | 120 | 303 | 120 |
| Production Rate, lb/hr | 25.9 | 35.2 | 26.7 | 32.0 |
| Bed Weight, lbs | 80.9 | 179.3 | 81.4 | 178.6 |
| Split % | 42.4 | 57.6 | 45.5 | 54.5 |
| RESIN PROPERTIES | | | | |
| Melt Index, g/10 min $I_{2.16}$ | 0.29 | | 0.35 | |
| Melt Index, g/10 min $I_5$ | 0.91 | | 1.07 | |
| Flow Index, g/10 min $I_{21.6}$ | 9.42 | | 10.27 | |
| Density, g/cc | 0.9570 | | 0.9476 | |
| MFR ($I_{21.6}/I_{2.16}$) | 32.3 | | 29.1 | |
| MFR ($I_{21.6}/I_5$) | 10.3 | | 9.6 | |

Results

The results are shown in Tables 2-9.

TABLE 2

Ethylene-Based Resin Overall Properties

| | Density (g/cc) | $I_{2.16}$ (g/10 min) | $I_{21.6}$ (g/10 min) | MFR ($I_{21.6}/I_{2.16}$) |
|---|---|---|---|---|
| Inventive Examples | | | | |
| Inventive Resin 1 | 0.9680 | 3.30 | 178 | 54 |
| Inventive Resin 2 | 0.9638 | 3.19 | 164 | 52 |
| Inventive Resin 3 | 0.9679 | 5.10 | 235 | 46 |
| Inventive Resin 4 | 0.9636 | 4.41 | 189 | 43 |
| Comparative Examples | | | | |
| Comparative Resin A | 0.966 | 7.76 | 209 | 27 |
| Comparative Resin B | 0.952 | 8.98 | 220 | 24 |

TABLE 3

Resin Molecular Weight Determined by GPC

| | Mn (g/mole) | Mw (g/mole) | Mz (g/mole) | Mw/Mn |
|---|---|---|---|---|
| *Inventive Examples* | | | | |
| Inventive Resin 1 | 8,704 | 89,110 | 421,329 | 10.2 |
| Inventive Resin 2 | 8,885 | 89,111 | 406,083 | 10.0 |
| Inventive Resin 3 | 9,786 | 81,202 | 389,627 | 8.3 |
| Inventive Resin 4 | 11,364 | 83,047 | 346,378 | 7.3 |
| *Comparative Examples* | | | | |
| Comparative Resin A | 14,418 | 71,099 | 246,579 | 4.9 |
| Comparative Resin B | 17,179 | 66,891 | 203,454 | 3.9 |

TABLE 4

Resin Thermal Properties

| | Heat Distortion Temperature at 66 psi (° C.) | Vicat Softening Temperature (° C.) | DSC $T_{melt}$ (° C.) | DSC $T_{cryst.}$ (° C.) | DSC $\Delta H_{melt}$ (J/g) | DSC $\Delta H_{cryst.}$ (J/g) |
|---|---|---|---|---|---|---|
| *Inventive Examples* | | | | | | |
| Inventive Resin 1 | 78 | 130 | 133.5 | 119.6 | 243 | 239 |
| Inventive Resin 2 | 80 | 131 | 132.9 | 119.5 | 237 | 233 |
| Inventive Resin 3 | 81 | 130 | 133.7 | 119.7 | 250 | 248 |
| Inventive Resin 4 | 80 | 130 | 132.8 | 119.2 | 230 | 233 |
| *Comparative Examples* | | | | | | |
| Comparative Resin A | 79 | 129 | 133.5 | 118.6 | 233 | 232 |
| Comparative Resin B | 69 | 127 | 130.1 | 116.2 | 212 | 210 |

TABLE 5

Resin Tensile and Flexural Properties

| | Yield Strength (psi) | Tensile Strength at Break (psi) | Elongation at Yield (%) | Elongation at Break (%) | 1% Secant Modulus (psi) | 2% Secant Modulus (psi) |
|---|---|---|---|---|---|---|
| *Inventive Examples* | | | | | | |
| Inventive Resin 1 | 4,814 | 2,559 | 7 | 230 | 276,000 | 235,000 |
| Inventive Resin 2 | 4,930 | 2,925 | 6 | 869 | 268,000 | 232,000 |
| Inventive Resin 3 | 4,713 | 4,065 | 5 | 18 | 285,000 | 247,000 |
| Inventive Resin 4 | 4,746 | 2,768 | 7 | 610 | 259,000 | 224,000 |
| *Comparative Examples* | | | | | | |
| Comparative Resin A | 4,661 | 2,607 | 8 | 560 | 265,000 | 228,000 |
| Comparative Resin B | 3,970 | 3,052 | 8 | 914 | 191,000 | 163,000 |

TABLE 6

Resin Vinyl Content

| | Inventive Resin 1 | Inventive Resin 2 | Inventive Resin 3 | Inventive Resin 4 |
|---|---|---|---|---|
| Vinyls per 1,000 carbon atoms | 0.12 | 0.13 | 0.14 | 0.15 |

TABLE 7

Resin ESCR Properties

| Product | ESCR, F50, (hours) |
|---|---|
| *Inventive Examples* | |
| Inventive Resin 1 | 24 |
| Inventive Resin 2 | 28 |
| Inventive Resin 3 | 13 |
| Inventive Resin 4 | 24 |
| *Comparative Examples* | |
| Comparative Resin A | 6 |
| Comparative Resin B | 17 |

TABLE 8

Removal Torque (RT) and Closure ESCR Properties

| Product | Replicates | RT (in-lb) | Closure ESCR (hours) | ESCR/RT (hours/in-lb) |
|---|---|---|---|---|
| *Inventive Examples* | | | | |
| Inventive Closure 1 | 5 | 12.9 | 5.8 | 0.45 |
| Inventive Closure 2 | 5 | 13.0 | 6.8 | 0.52 |

TABLE 8-continued

Removal Torque (RT) and Closure ESCR Properties

| Product | Replicates | RT (in-lb) | Closure ESCR (hours) | ESCR/RT (hours/in-lb) |
|---|---|---|---|---|
| Inventive Closure 3 | 5 | 12.7 | 4.9 | 0.39 |
| Inventive Closure 4 | 5 | 13.6 | 5.7 | 0.42 |
| Comparative Examples | | | | |
| Comparative Closure A | 5 | 12.4 | 3.4 | 0.27 |
| Comparative Closure B | 5 | 16.1 | 5.2 | 0.32 |

Figure 1:
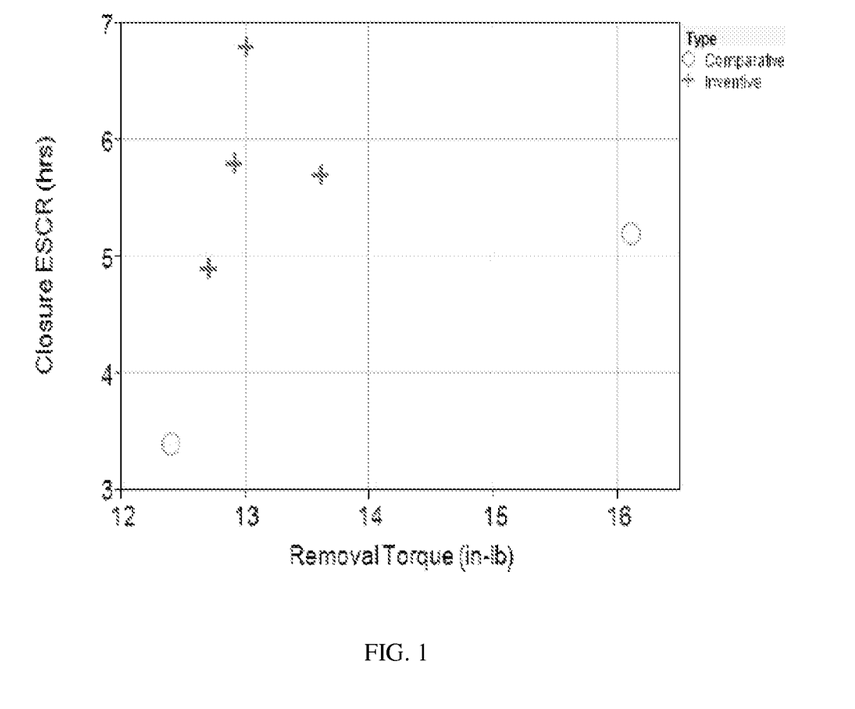
FIG. 1 graphically depicts the closure environmental stress crack resistance as a function of removal torque for closures made from according to one or more embodiments shown or described herein in comparison to comparative closures.
Figure 2:
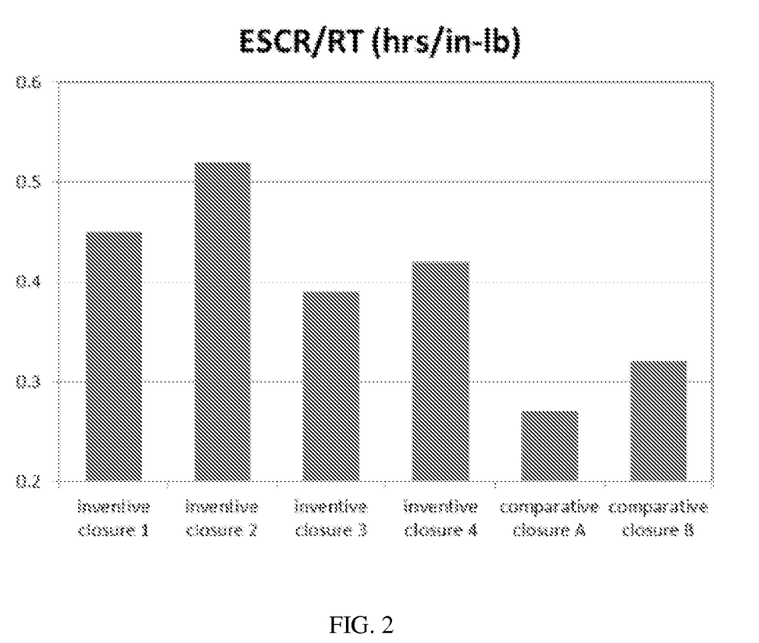
FIG. 2 graphically depicts the ratio of environmental stress crack resistance to removal torque for closures made from according to one or more embodiments shown or described herein in comparison to comparative closures.

Referring to FIG. 1, the closure environmental stress crack resistance (ESCR) measurements are plotted as a function of removal torque. The inventive closures, which were fabricated with the inventive materials, resulted in a lower removal torque than comparative closure B, while yielding a higher closure ESCR than comparative closure A. The inventive closures exhibit both low removal torque and high ESCR. Referring to FIG. 2, the ratio of the closure ESCR to removal torque is plotted for the inventive and comparative closures. Without being bound by theory, it is believed that the lower the removal torque the easier the closure can be removed from the bottle. Also, the higher the ESCR can provide improved resistance to cracking and, therefore, the improved protection offered to the product being contained using the closure. It is also believed that higher ESCR can also enable thickness reductions without sacrificing environmental stress crack resistance performance. The inventive samples have a favorable balance of properties for closures applications.

Figure 3:
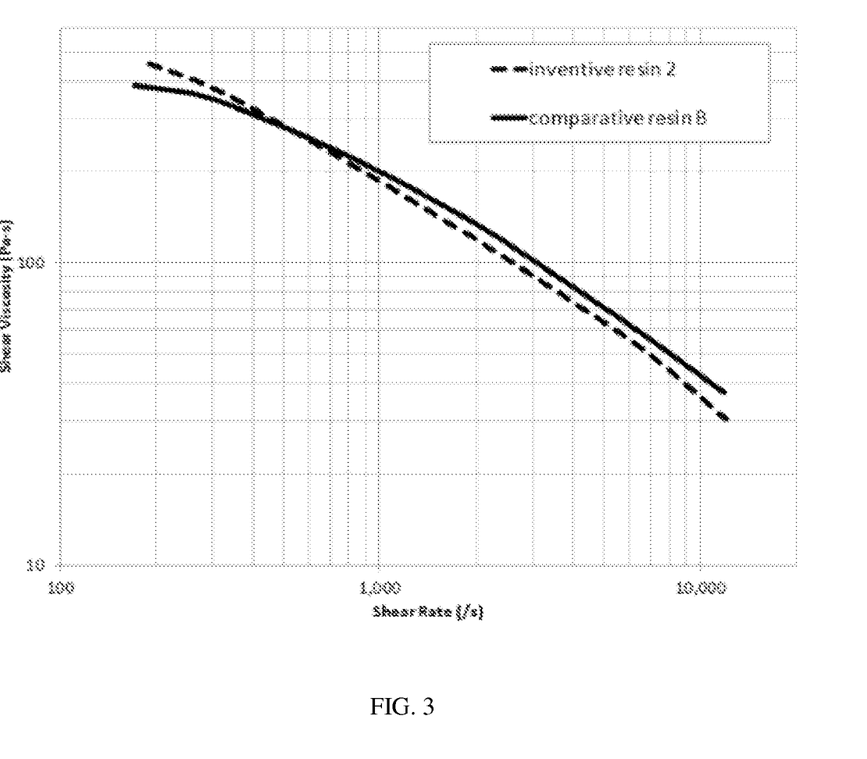
FIG. 3 graphically depicts the shear viscosity at various shear rates for an ethylene-based resin according to one or more embodiments shown or described herein in comparison to a comparative ethylene-based resin.

Referring to FIG. 3, depicted is the shear viscosity at various shear rates for inventive resin 2 and comparative resin B. As depicted, the results demonstrate the improved flow characteristics of inventive resin 2 relative to comparative resin B. At shear rates greater than 450/s (a condition common in high speed, high cavitation closure molding), the shear viscosity of inventive resin 2 is lower than comparative resin B. The lower shear viscosity can demonstrate the good processing characteristics (e.g., moldability) of inventive resin 2 to commercially mold closures. Without being bound by theory, it is believed that as the shear viscosity of the resin is reduced, the easier it is for the resin to adequately fill the mold during injection.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, if any, including any cross-referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

The invention claimed is:

1. A Ziegler-Natta catalyzed ethylene-based resin comprising a high molecular weight component and a low molecular weight component, wherein the high molecular weight component comprises an ethylene/alpha-olefin copolymer or ethylene homopolymer, and has a density ranging from 0.945 g/cc to 0.960 g/cc, a high load melt index ($I_{21.6}$) ranging from 4 g/10 min to 15 g/10 min, and a melt flow ratio ($I_{21.6}/I_{2.16}$) ranging from 25 to 40,
wherein the ethylene-based resin has:
an overall density ranging from greater than 0.962 g/cc to less than or equal to 0.970 g/cc;
an overall melt index ($I_{2.16}$) ranging from 0.5 g/10 min to 6 g/10 min;
a high load melt index ($I_{21.6}$) ranging from 125 to 300 g/10 min;
an overall melt flow ratio ($I_{21.6}/I_{2.16}$) ranging from 40 to 90;
less than 0.2 vinyls per 1000 carbon atoms; and
a ratio of weight average molecular weight to number average molecular weight,
Mw/Mn, ranging from 6 to 12; and
wherein the ethylene-based resin has an environmental stress crack resistance (ESCR) ($F_{50}$) according to ASTM D-1693, condition B at 50° C. using 100% nonylphenol ethoxylate with 9 moles of ethylene oxide, in the range of 10 to 60 hours.

2. The resin of claim 1, wherein the ethylene-based resin comprises from 35% to about 55% by weight of the high molecular weight component.

3. The resin of claim 1, wherein the ethylene-based resin has a flexural, 2% secant modulus greater than 200,000 psi.

4. The resin of claim 1, wherein the low molecular weight component comprises an ethylene homopolymer.

5. The resin of claim 1, wherein the low molecular weight component has a density that is at least 0.005 g/cc higher than the density of the high molecular weight component.

6. The resin of claim 1, wherein the ethylene-based resin has a weight average molecular weight, Mw, of from 75,000 g/mole to 115,000 g/mole.

7. A closure comprising the ethylene-based resin of claim 1.

8. A method of manufacturing an ethylene-based resin, the method comprising:
polymerizing a high molecular weight component comprising an ethylene/alpha-olefin copolymer or ethylene homopolymer in a reactor using a Ziegler-Natta catalyst, wherein the high molecular weight component has a density ranging from 0.945 g/cc to 0.960 g/cc, a high load melt index ($I_{21.6}$) ranging from 4 g/10 min to 15 g/10 min, and a melt flow ratio ($I_{21.6}/I_{2.16}$) ranging from 25 to 40; and
polymerizing a low molecular weight component in a different reactor, thereby producing an ethylene-based resin;
wherein the two reactors are operated in series; and wherein the ethylene-based resin has:
  an overall density ranging from greater than 0.962 g/cc to less than or equal to 0.970 g/cc;
  an overall melt index ($I_{2.16}$) ranging from 0.5 g/10 min to 6 g/10 min;
  a high load melt index ($I_{21.6}$) ranging from 125 to 300 g/10 min;
  an overall melt flow ratio ($I_{21.6}/I_{2.16}$) ranging from 40 to 90;
  less than 0.2 vinyls per 1000 carbon atoms; and
  a ratio of weight average molecular weight to number average molecular weight,
  Mw/Mn, ranging from 6 to 12;
wherein the ethylene-based resin has an environmental stress crack resistance (ESCR) ($F_{50}$) according to ASTM D-1693, condition B at 50° C. using 100% nonylphenol ethoxylate with 9 moles of ethylene oxide, in the range of 10 to 60 hours.

9. The method of claim 8, wherein the ethylene-based resin comprises from 35% to about 55% by weight of the high molecular weight component.

10. The method of claim 8, wherein ethylene-based resin has a flexural, 2% secant modulus greater than 200,000 psi.

11. The method of claim 8, wherein the low molecular weight component comprises an ethylene homopolymer.

12. The method of claim 8, wherein the low molecular weight component has a density that is at least 0.005 g/cm³ higher than the density of the high molecular weight component.

* * * * *